(12) United States Patent
Hewitt et al.

(10) Patent No.: US 9,467,452 B2
(45) Date of Patent: Oct. 11, 2016

(54) TRANSFERRING SERVICES IN A NETWORKED ENVIRONMENT

(71) Applicant: International Business Machines Corporation, Armonk, NY (US)

(72) Inventors: Trudy L. Hewitt, Cary, NC (US); Francesco C. Schembari, Durham, NC (US); Robert M. Schwenn, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 13/892,378

(22) Filed: May 13, 2013

(65) Prior Publication Data

US 2014/0337494 A1    Nov. 13, 2014

(51) Int. Cl.
| | |
|---|---|
| *H04L 12/66* | (2006.01) |
| *H04L 29/06* | (2006.01) |
| *H04L 29/08* | (2006.01) |
| *H04W 4/00* | (2009.01) |
| *H04W 4/20* | (2009.01) |

(52) U.S. Cl.
CPC ............. *H04L 63/101* (2013.01); *H04L 67/22* (2013.01); *H04W 4/001* (2013.01); *H04W 4/206* (2013.01)

(58) Field of Classification Search
CPC ................................................... H04L 41/5038
USPC .......................................................... 709/223
See application file for complete search history.

(56) References Cited

U.S. PATENT DOCUMENTS

| 8,639,827 B1 * | 1/2014 | Dinn et al. ................... 709/229 |
| 2002/0026592 A1 | 2/2002 | Gavrila et al. |

(Continued)

FOREIGN PATENT DOCUMENTS

| CN | 101262474 B | 2/2012 | |
| GB | EP 2107780 A1 * | 10/2009 | ............ H04M 17/00 |

OTHER PUBLICATIONS

Butler J., "Extending Role Based Access Control" A SANS Whitepaper, Apr. 2011 [online], [retrieved on Jan. 24, 2013], Retrieved from the Internet, <URL: http://www.sans.org/reading_room/analysts_program/access-control-foxt.pdf>.

(Continued)

*Primary Examiner* — Nicholas Taylor
*Assistant Examiner* — Sanjoy Roy
(74) *Attorney, Agent, or Firm* — Jason H. Sosa; William H. Hartwell

(57) ABSTRACT

The computer transitions services from a first user to a second user by receiving a notification of transition of job function from a first user to a second user. The computer determines, by one or more computer processors, services utilized by the first user in performance of the job function. The computer determines, by one or more computer processors, usage information for each of the services. The computer notifies the second user of the services utilized by the first user in performance of the job function and the determined usage information for each of the services.

17 Claims, 6 Drawing Sheets

(56) References Cited

U.S. PATENT DOCUMENTS

| | | | |
|---|---|---|---|
| 2007/0214497 A1 | 9/2007 | Montgomery et al. | |
| 2007/0283443 A1 | 12/2007 | McPherson et al. | |
| 2009/0157570 A1* | 6/2009 | Pall et al. | 706/11 |
| 2009/0198834 A1* | 8/2009 | Crow | H04L 67/16 709/245 |
| 2011/0145589 A1 | 6/2011 | Camenisch et al. | |
| 2011/0208824 A1* | 8/2011 | Lidstrom et al. | 709/206 |
| 2012/0042362 A1* | 2/2012 | Vlasov et al. | 726/4 |
| 2012/0047106 A1* | 2/2012 | Swaminathan et al. | 706/60 |
| 2012/0174194 A1 | 7/2012 | Furukawa | |
| 2012/0191714 A1* | 7/2012 | Datar et al. | 707/737 |
| 2014/0074601 A1* | 3/2014 | Delug | G06Q 30/02 705/14.53 |
| 2014/0278658 A1* | 9/2014 | Straznitskas | 705/7.17 |

OTHER PUBLICATIONS

Ferraiolo et al., "A Role-Based Access Control Model and Reference Implementation Within a Corporate Intranet", ACM Transactions on Information and System Security, vol. 2, No. 1, Feb. 1999, pp. 34-64, Copyright 1999.

Monson, et al., "Building Composite, Role-Based Dashboards with WebSphere Dashboard Framework", IBM Corporation, First Edition (Aug. 2007), Copyright IBM Corp. 2007.

* cited by examiner

| NAME | DESCRIPTION | LINK | SERVER LOCATION |
|---|---|---|---|
| STAFF DOC | The purpose of this teamroom is to allow for... | | Title: STAFF DOC<br>Server: D1000DM/01/ABC<br>Filename: DBC\ABCD01.nsf |
| TEAM ROOM PROJECT | The purpose of this teamroom is for management to... | | Title: TEAM ROOM PROJECT<br>Server: D1001DM/01/ABC<br>Filename: DBC\ABCD02.nsf |
| CAREER TRACKING TOOL | The repository for employees to track and plan... | | Title: CAREER TRACKING TOOL<br>Server: D1002DM/01/ABC<br>Filename: DBC\ABCD03.nsf |
| INTEGRATED NOTES | Tool is used to obtain information from the ... | | Title: INTEGRATED NOTES<br>Server: D1003DM/01/ABC<br>Filename: DBC\ABCD04.nsf |
| OPERATIONS REVIEW | Tool is used to post and monitor various projects when... | | Title: OPERATIONS REVIEW<br>Server: D1004DM/01/ABC<br>Filename: DBC\ABCD05.nsf |
| CONTRIBUTION TOOL | Tool is used by managers to analyze relative contribution... | | Title: CONTRIBUTION TOOL<br>Server: D1005DM/01/ABC<br>Filename: DBC\ABCD06.nsf |

FIG. 5

TRANSFERRING SERVICES IN A NETWORKED ENVIRONMENT

FIELD OF THE INVENTION

The present invention relates generally to the field of service provisioning to support specific job functions and more particularly to migrating access to specific services from one user to another.

BACKGROUND OF THE INVENTION

As used herein, a "service" is any application or resource that can be provided to a user by a computer system. Many organizations have a pool of services that are offered to their respective members. Typically, such services are made available to members via one or more interconnected computer systems accessible to all members. Exemplary implementations that may be used to provide such accessibility include, in a non-exhaustive list, central data centers, distributed or networked "grid" computing environments, and cloud computing environments. Depending on respective job functions, various members may utilize different commonly accessible services. Additionally, within an organization, different members may have access (system granted permission) to different services or levels of a service based on their respective job functions.

Access to various services or levels of a service may be determined via an access control list (ACL), which, generally, is a list of permissions attached to an object. More specifically, an ACL is a data structure (usually a table) containing entries that specify an individual user or group rights to specific system objects (services) such as programs, processes, or files.

SUMMARY

Embodiments of the present invention disclose a method, computer program product, and computer system for transitioning services from a first user to a second user, the method comprising, receiving a notification of transition of job function from a first user to a second user. Determining, by one or more computer processors, services utilized by the first user in performance of the job function. Determining, by one or more computer processors, usage information for each of the services. Notifying the second user of the services utilized by the first user in performance of the job function and the determined usage information for each of the services.

BRIEF DESCRIPTION OF THE SEVERAL VIEWS OF THE DRAWINGS

FIG. 5 is an example user interface display sent to user transitioning into a job function based on a hypothetical scenario of the service migration program, in accordance with an embodiment of the present invention.

DETAILED DESCRIPTION

Figure 1:
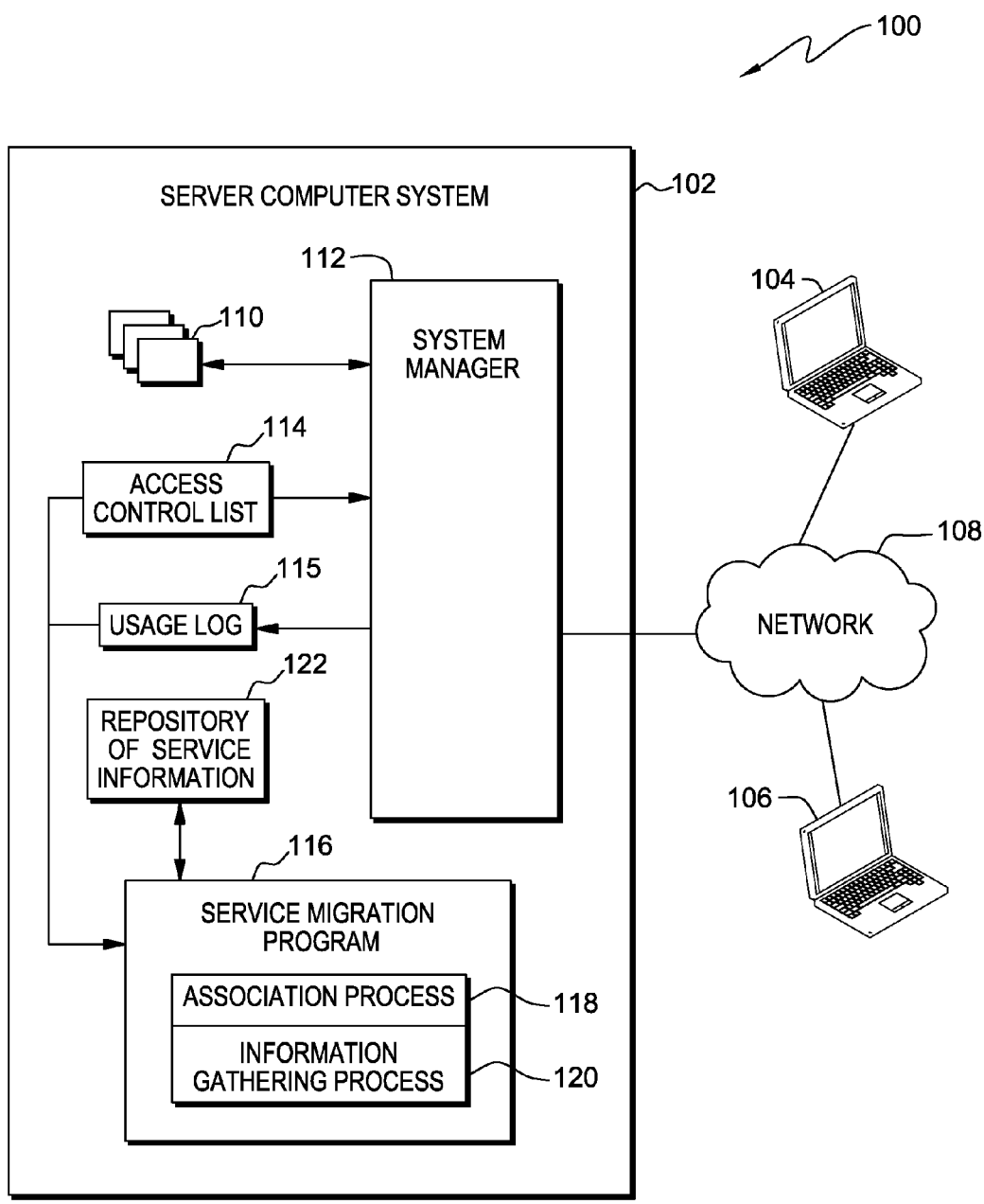
FIG. 1 is a functional block diagram illustrating a distributed data processing environment, in accordance with an embodiment of the present invention.

As a first person transitions out of a position or job function, for example, through promotion, a second person is often transitioning into the position left behind. Embodiments of the present invention recognize that the person transitioning into the position may require or desire knowledge of, and access to, the same set of services used by the first person in performance of the job function. While the first person can manually prepare a list of such services and describe the services' functions and relevance, an automated process for preparing such a list and providing necessary permissions may greatly affect the ease and efficiency of the transition.

Embodiments of the present invention further recognize that predefined access lists do not typically associate a service with a job function and do not distinguish between services that are accessible to a user and services that are actually being utilized by a user. Embodiments of the present invention provide a system the ability to create and maintain associations between a job function and services used in performance of the job function. During a transition of job function, embodiments of the present invention can create, or assist in the creation of, a list of services utilized by a person in performance of the job function for a person transitioning into the role. Preferred embodiments may additionally provide usage information, including, for example, a general function or use of the service, when the service is used, and how to access the service. Embodiments may also assist in obtaining access to services when necessary.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow-chart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 is a functional block diagram illustrating a distributed data processing environment, generally designated 100, in accordance with one embodiment of the present invention. Distributed data processing environment 100 includes server computer system 102 interacting with client computers 104 and 106 over network 108.

Server computer system 102 may be a specialized computer server accessible to multiple client computers via network 108. In certain embodiments, server computer system 102 represents a computer system utilizing clustered computers and components communicating with each other through various connections and protocols to act as a single pool of seamless resources when accessed through network 108, as is common in data centers and with cloud computing applications. In general, computer 102 is representative of any programmable electronic device or combination of programmable electronic devices capable of executing machine-readable program instructions and communicating with other computing devices via a network.

Server computer system 102 may store, maintain, and provide various services, e.g., services 110, to clients of server computer system 102, e.g., client computers 104 and 106. Services 110 can include various applications and resources (programs, processes, databases, files, etc.) accessible to clients via network 108. In various embodiments, services 110 may be stored on a central server system or distributed across multiple systems and storage components within server computer system 102. System manager 112 represents one or more programs or routines that collectively provide and manage access to services of server computer system 102.

Server computer system 102 may also maintain ACL 114. ACL 114 provides a list of permissions and rules for accessing services 110. In one embodiment, system manager 112 provides access to services in accordance with the permissions and rules of ACL 114. Additionally, system manager 112 may maintain a system log, e.g., usage log 115. Usage log 115 stores a record of events, including, for example, services accessed by various users. Logged events often include a date and time of occurrence.

Service migration program 116 resides in server computer system 102 and, upon notification of a transition of job function, operates to determine services relevant to the job function and notify a person transitioning into the job function of the determined services. Service migration program 116 may also provide, to a person transitioning into the job role, access to services. Association process 118 may be a function or subroutine of service migration program 116, and determines services corresponding to a job function, e.g., through examination of usage log 115. In one embodiment, association process 118 operates during a transition of job function. In another embodiment, association process may operate periodically to maintain an updated list of job function to service associations. Information gathering process 120 may also be a function or subroutine of service migration program 116, and may determine and/or retrieve contextual usage information related to a service. Usage information may include descriptions of the service, useful functions, when the tool should be used, etc. Some of this information may be predefined, while some of it may be gathered from patterns discerned from usage log 115 and/or from information gathered directly from users. Both job function to service associations and usage information may be stored in a repository of service information (hereafter repository 122).

As a list of desired services is collected, service migration program 116 may prepare the list for a user transitioning into the job function, append to the list any acquired contextual information, and may update permissions in ACL 114 to allow the transitioning user access to various services. Service migration program 116 may send the collected information to the user.

In various embodiments of the present invention, computer 104 and computer 106 can be laptop computers, tablet computers, netbook computers, personal computers (PCs), desktop computers, personal digital assistants (PDAs), smartphones, or any other programmable electronic device capable of communicating with server computer system 102 via network 108.

In one embodiment, client computers 104 and 106 may be owned, and at least nominally controlled (e.g., required to install various security software, updates, etc.) by the same organization controlling server computer system 102. In such an embodiment, client computers 104 and 106 may be considered part of server computer system 102 and may operate instances of service migration program 116 locally.

Network 108 can be any combination of connections and protocols that will support communications between server computer system 102, client computer 104, and client computer 106. Network 108 can include, for example, a local area network (LAN), a wide area network (WAN) such as the internet, a cellular network, or any combination of the preceding, and can further include wired, wireless, and/or fiber optic connections.

Figure 2:
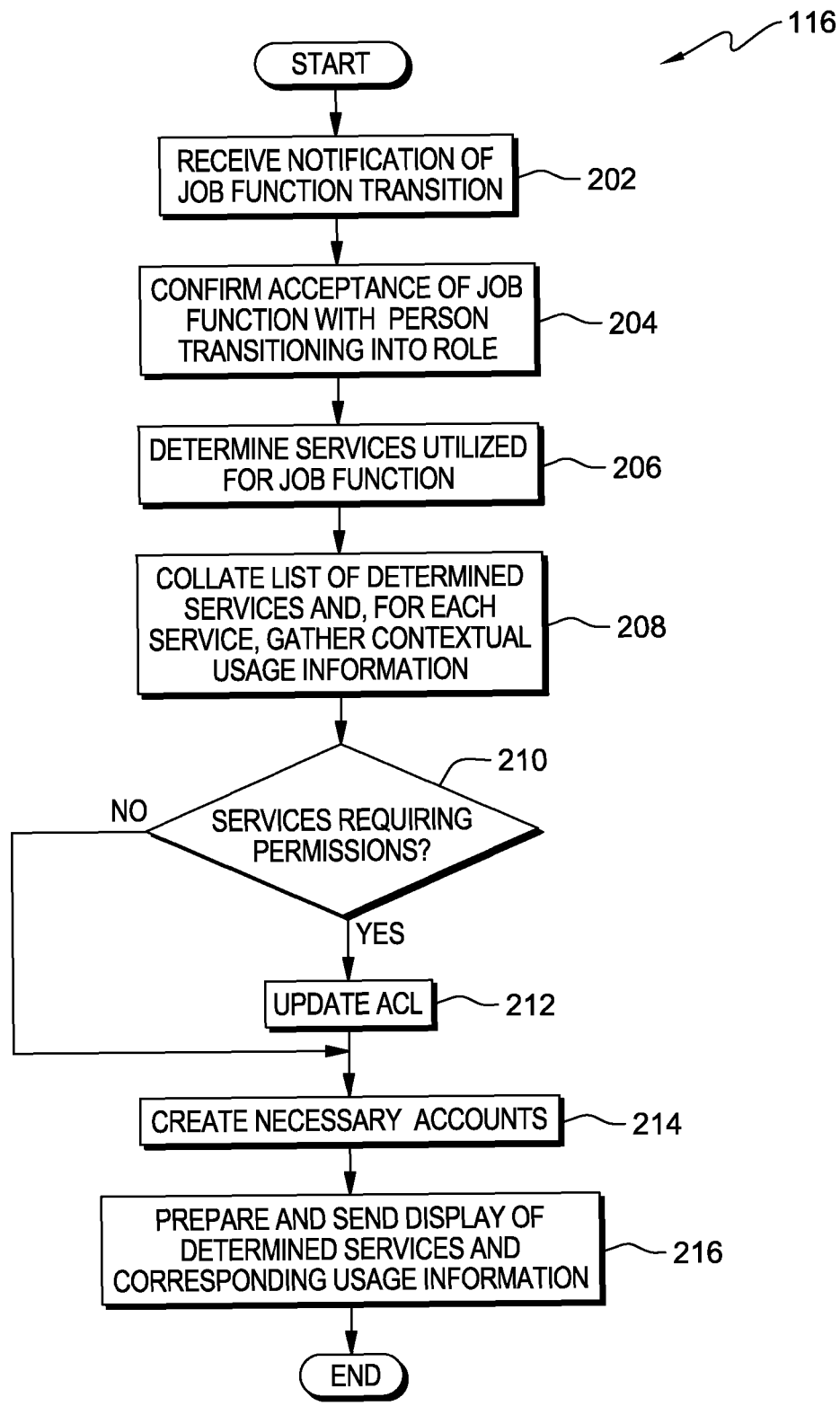
FIG. 2 is a flowchart depicting operational steps for a service migration program for transitioning services from a first user to a second user, in accordance with an embodiment of the present invention.

FIG. 2 is a flowchart depicting operational steps of service migration program 116 for determining services relevant to a specific job function and notifying a person transferring into the job function of the relevant services, in accordance with one embodiment of the present invention. For purposes of discussion, service migration program 116 is transferring the job function of user A to user B. Users A and B may be respective users of client computer 104 and 106.

Service migration program 116 receives a notification of a job function transition between users A and B (step 202). In one embodiment, the person transitioning the job function, e.g., user A, may initiate and notify service migration program 116. In another embodiment, service migration program 116 may only be accessible to authorized users (e.g., a system administrator), and service migration program 116 may receive the notification from an authorized user. In one implementation, upon initiation of service migration program 116, service migration program 116 may request from the initiating user, via a user interface, a job function being transferred (e.g., by job title), identification of the user the job function is being transferred from (e.g., user A), and identification of the user the job function is being transferred to (e.g., user B).

Upon notification of the job function transition, service migration program 116 may, in one embodiment, confirm acceptance of the job function with user B (step 204). For example, service migration program 116 may generate an electronic message such as an email, instant message, or text, requesting a confirmatory response. Another embodiment may not require confirmation.

In step 206, service migration program 116 determines services utilized for the job function. Service migration program 116 may determine the services from a variety of sources, including, for example, predefined associations between services and job function, usage logs, and input from user A. In one embodiment, service migration program 116 initiates association process 118 to perform the determination. As depicted, association process 118 is a subroutine or function of service migration program 116. In an alternate embodiment, association process 118 may be an independent program in communication with service migration program 116. An exemplary sequence of actions performed by association process 118 is described in greater detail with respect to FIG. 3.

Service migration program 116 collates a list of the determined services, and for each service, gathers contextual usage information (step 208). Contextual usage information may describe a specific service's function, when the service is used, how often the service is used, and how the service can be accessed. In one embodiment, service migration program 116 gathers usage information via information gathering process 120. As depicted, information gathering process 120 is an additional subroutine or function of service migration program 116. In an alternate embodiment, information gathering process may be an independent program in communication with service migration program 116. In yet another embodiment, information gathering process 120 and association process 118 may operate as a single program or routine that determines associations between services and job functions, and gathers contextual usage information for each service. An exemplary sequence of actions performed by information gathering process 120 is described in greater detail with respect to FIG. 4.

Service migration program 116 also determines whether there are determined services for which permissions are required (step 210). Service migration program 116 may search ACL 114 for associations between user A and a determined service and between user B and the determined service. Where user A has access to a service utilized by the job function and user B does not, service migration program 116 determines that permission to access the service should be granted to user B. In instances where access is permitted to both user A and user B, service migration program 116 may compare levels of access and/or access rules to ensure that user B can access the same functionalities as user A.

If there are permissions required, service migration program 116 updates the ACL with the necessary changes (step 212). In at least one implementation, service migration program 116 may not have direct authority to edit ACL entries, and may instead send a notification to an authorized user or administrator responsible for maintaining ACL 114.

In step 214, service migration program 116 creates necessary accounts for determined services. While some services are accessible immediately (e.g., access to read or edit a file), other services may require a user account. For example, applications that can store information specific to a user or maintain and/or receive tasks specific to a user. In one embodiment, service migration program 116 may create or initiate the creation of such an account. Additionally, to maintain continuity during a transition period, information from user A's account may also be transferred to user B's account. For example, if a service of user A maintained a list of tasks to be performed relevant to the job function, forwarding that information to user B's account would assist the transition. In one embodiment, service migration program 116 may query user A as to whether such information should be transferred.

In step 216, service migration program 116 prepares a display of the determined services and corresponding usage information, and sends the display to user B. The display may be organized based on predefined rules or preferences on how the information should be presented to user B. In one embodiment, service migration program 116 arranges the list of services into a template including service name, a summary of the service explaining function and/or properties, and information on how to access the service. Information on how to access the service may include account information if an account was created for a listed service. In one embodiment, service migration program 116 sends a report containing the obtained information via email to user B.

Figure 3:
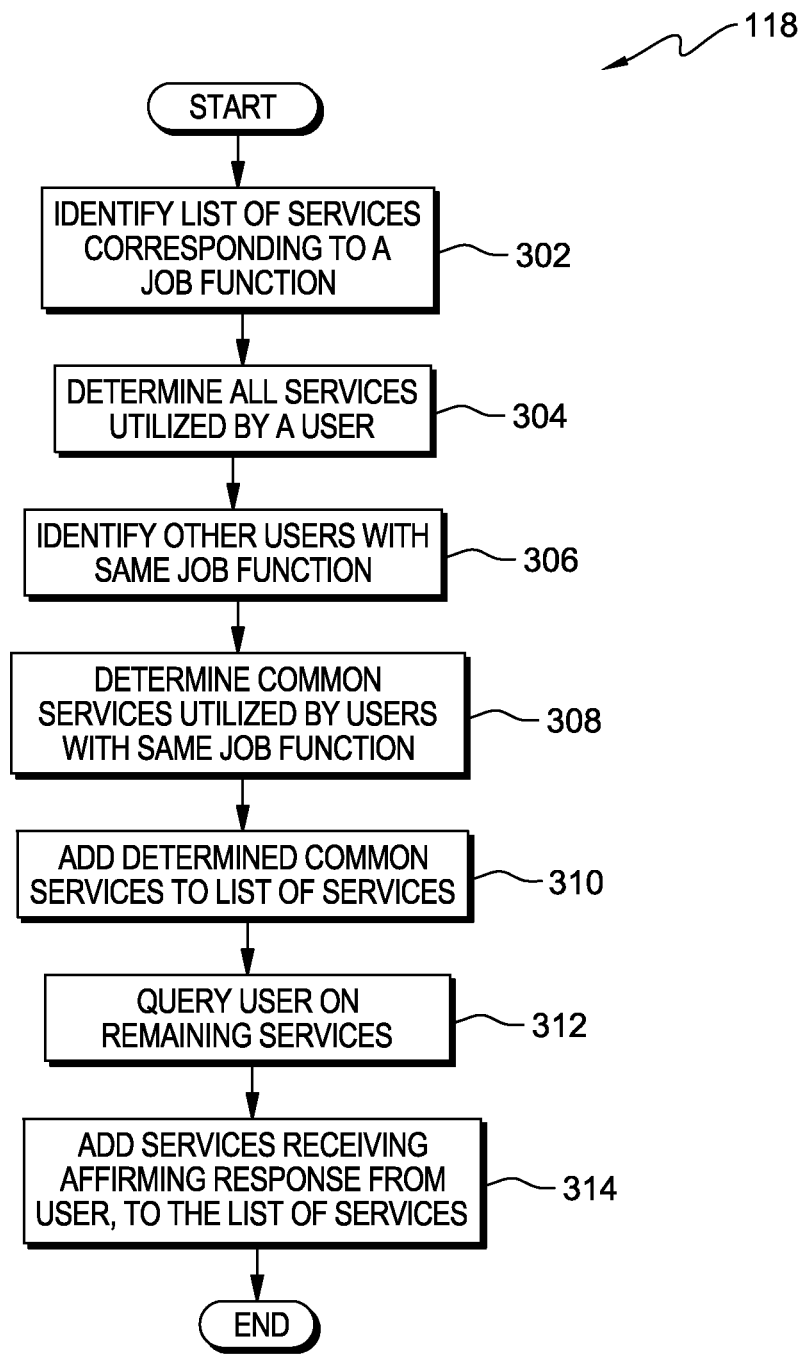
FIG. 3 is a flowchart depicting operational steps of an association process determining associations between services and a specific job function, in accordance with an embodiment of the present invention.

FIG. 3 is a flowchart depicting operational steps for association process 118 for associating services with a specific job function, in accordance with one implementation of the present invention.

In one embodiment, association process 118 identifies a list of services corresponding to a specific job function (step 302). In a preferred embodiment, the list of services corresponding to the specific job function is updated by operation of association process 118 and maintained subsequent to operation of association process 118. This allows an iteration of association process 118 to begin with a list of services as updated in a previous iteration. Job functions and associated lists of services can be stored and maintained in repository of service information 122. Repository 122 may be maintained as a database. Initial creation of the list of services corresponding to the specific job function may begin with a determination of any predefined associations between a service and the specific job function. Some ACLs provide access rules and permissions specifically by a job function, and in one embodiment, association process 118 begins by examining ACL 114 for such associations. Subsequent iterations may recheck ACL 114 for any changes and update an existing list of associations found in repository 122. If no list of services corresponding to the specific job function exists, and no predefined association can be determined, association process 118 may create a new entry for the specific job function in repository 122.

In step 304, association process 118 determines all services utilized by user A (the user transitioning out of the job function). In various embodiments, users can be distinguished by name, user name, unique employee number, etc. Some systems maintain a list of all services "owned" by a user. In one embodiment, association process 118 accesses such a list. In another embodiment, association process 118 identifies all services to which user A has access to as defined by ACL 114. However, such a list might be incomplete, as services which do not require special permission or access rules may not be specifically associated with any user. Additionally, such a list might be over-inclusive as not every service that a user has access to need actually be utilized by the user. In another embodiment, association process may access usage log 115 and search for unique services accessed by user A over a predefined period (e.g., over the course of a year). Virtually every system maintains such logs, and such an embodiment may provide the most accurate picture of services utilized by user A.

However, services utilized do not necessarily correspond to the job function. For example, a single user may have multiple job functions. Association process 118 may identify other users with the same job function (step 306), for example by comparing job titles listed for individuals in a corporate directory. Association process 118 may then determine common services utilized by users with the same job function (step 308). Determined common services that are not already in the list of services associated with the job function may be added to the list of services (step 310).

In one embodiment, association process 118 may query user A as to remaining services, of the services utilized by user A, that have not been associated with the job function (step 312). For example, association process 118 may send, to user A, a message asking whether a specific service is used for the job function. Upon receipt of an affirmative response, the service may be added to the list or services associated with the job function (step 314).

Figure 4:
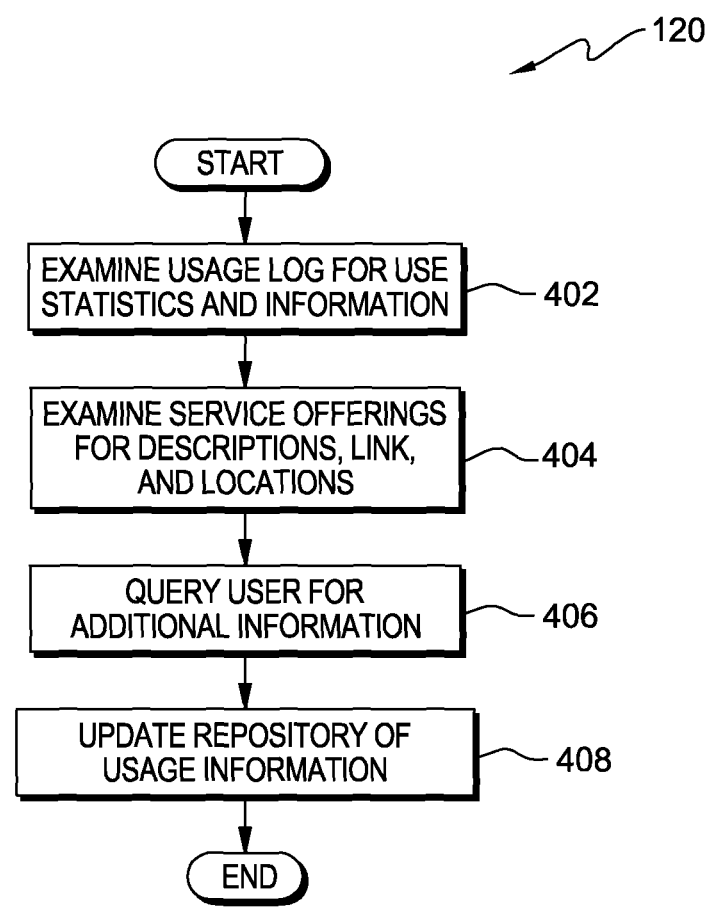
FIG. 4 is a flowchart depicting operational steps of an information gathering process for collecting contextual usage information on services used in performance of a job function.

FIG. 4 is a flowchart depicting operational steps of information gathering process 120 for gathering contextual usage information for each service associated with the job function, in accordance with one implementation of the present invention. In one implementation, contextual usage information can be stored and maintained in repository 122 in association with each service corresponding to a job function. Iterations of information gathering process 120 can update such associations.

In step 402, information gathering process 120 examines usage log 115 for use statistics, over a defined period, for each service associated with the job function. Information gathering process 120 can determine from the usage logs when and how often a service is accessed by user A. From this, patterns can be detected, for example when typical access occur, such as time of day, day of week, end of quarter, end of year, etc. This information may be stored or updated in repository 122.

Usage log 115 may, in one embodiment, indicate a location for the service, for example, in the form of a server address. Additionally, depending on the level of detail recorded in usage log 115 key operations of a service used or actions taken upon a service may be discernable.

Additionally, information gathering process 120 can examine service offerings for program descriptions, links to services, and service locations (step 404). If service offerings are unavailable for any or all of the services, information gathering process 120 may query user A for relevant descriptions (step 406). Any information determined by operations 402, 404, and 406 may be stored in repository 122 in association with the service and/or job function (step 408).

FIG. 5 is an example user interface display sent to user B based on a hypothetical scenario of service migration program 116.

In this exemplary embodiment, service migration program 116 displays a report containing a list of programs and program properties used by user A in performance of a job function. A template for the report can be pre-established. In this example, the template has a column and row with columns representing a single property of a program, and each row representing a single program. Column 502 contains names of each of the programs and column 504 contains a description of each of the programs such as, why and how each of the programs is used. Column 506 contains a link to each of the programs. Column 508 provides the location of a computer within server computer system 102 on which each of the programs is stored (e.g., server location). Service migration program 116 obtains all of the information in columns 502, 504, 506 and 508 from repository 122 and through the operations performed and discussed with regard to FIGS. 2, 3, and 4.

Figure 6:
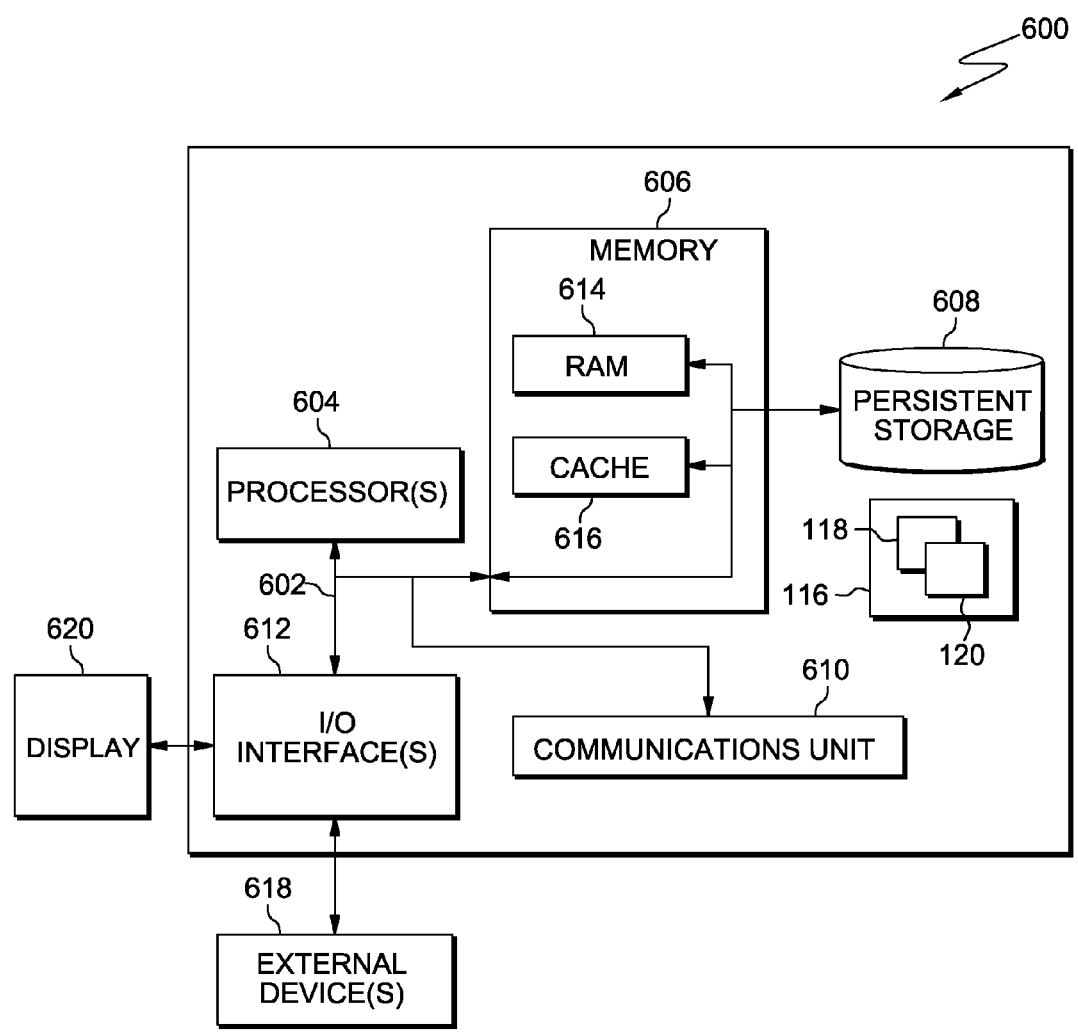
FIG. 6 depicts a block diagram of components of the computer device executing the service migration program, in accordance with an embodiment of the present invention.

FIG. 6 depicts a block diagram of components of a computer 600 operating service migration program 116 within server computer system 102, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Service migration program 116, including association process 118 and information gathering process 120, is stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

In these examples, communications unit 610 includes one or more network interface cards. Communications unit 610 may provide communications through the use of either or both physical and wireless communications links. Service migration program 116 may be downloaded to persistent storage 608 through communications unit 610.

I/O interface(s) 612 allows for input and output of data with other devices that may be connected to computer device 104. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g. service migration program 116, can be stored on such portable computer-readable storage media and can be loaded onto persistent storage 608 via I/O interface(s) 612. I/O interface(s) 612 may also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions

What is claimed is:

1. A method for transitioning services from a first user to a second user, the method comprising:
    determining, by one or more computer processors, services utilized by the first user in performance of a first job function, wherein the second user in a second job function is transitioning to the first job function;
    receiving, by one or more computer processors, usage log data for each of the services utilized in the performance of the first job function;
    generating, by one or more processors, natural language usage information for each of the services utilized in the performance of the first job function based on the received usage log data;
    responsive to determining a first service of the services utilized by the first user in the performance of the first job function is not included in services utilized by the second user in the performance of the second job function, updating, by one or more processors, an access control list tracking service usage for the first job function and the second job function, wherein updating the access control list grants the second user access to the first service;
    determining, by one or more computer processors, that the second user does not have a user account for authenticating access to the first service based on the user account not being present in the access control list;
    responsive to determining an existing user account for the first user for authenticating access to the first service includes information specific to the first user, creating a user account for the second user for authenticating access to the first service based on the existing user account for the first user for authenticating access to the first service, wherein the created user account excludes the determined information specific to the first user; and
    displaying on a computer to the second user the services utilized by the first user in performance of the first job function, information associated with the created user account for the second user, and the generated natural language usage information for each of the services.

2. The method of claim 1, wherein the usage information for each of the services includes common actions performed by the first user in use of the service and common actions performed by the service responsive to the first user.

3. The method of claim 1, wherein determining the services further comprises:
    determining one or more additional users with the job function;

comparing each of the one or more additional users historical use of services with the historical user of services by the first user; and determining common services utilized by the one or more additional users with the job function.

4. The method of claim 1, wherein receiving usage log data for each of the services utilized in the performance of the first job function further comprises:

examining the usage log data for data pertaining to the services utilized in the performance of the first job function by the first user; and responsive to determining that data pertaining to each of the services utilized by the first user is not available, querying the first user for the usage information for each of the services utilized by the first user.

5. A computer program product for transitioning services from a first user to a second user, the computer program product comprising:

one or more computer readable storage devices;

program instructions stored on the one or more computer readable storage devices, wherein the one or more computer readable storage devices are not signals per se, the program instructions comprising:

program instructions to determine services utilized by the first user in performance of a first job function, wherein the second user in a second job function is transitioning to the first job function;

program instructions to receive usage log data for each of the services utilized in the performance of the first job function;

program instructions to generate natural language usage information for each of the services utilized in the performance of the first job function based on the received usage log data;

program instructions to, responsive to determining a first service of the services utilized by the first user in the performance of the first job function is not included in services utilized by the second user in the performance of the second job function, update an access control list tracking service usage for the first job function and the second job function, wherein updating the access control list grants the second user access to the first service;

program instructions to determine that the second user does not have a user account for authenticating access to the first service based on the user account not being present in the access control list program instructions to, responsive to an existing user account for the first user for authenticating access to the first service includes information specific to the first user, create a user account for the second user for authenticating access to the first service based on the existing user account for the first user for authenticating access to the first service, wherein the created user account excludes the determined information specific to the first user; and program instructions to display on a computer to the second user the services utilized by the first user in performance of the first job function, information associated with the created user account for the second user, and the generated natural language usage information for each of the services.

6. The computer program product of claim 5, wherein the usage information for each of the services includes common actions performed by the first user in use of the service and common actions performed by the service responsive to the first user.

7. The computer program product of claim 5, wherein determining the services further comprises program instructions, stored on the one or more computer readable storage devices, which when executed by one or more processors, cause the one or more processors to:

determine one or more additional users with the job function;

compare each of the one or more additional users historical use of services with the historical user of services by the first user; and determine common services utilized by the one or more additional users with the job function.

8. The computer program product of claim 5, wherein receiving usage log data for each of the services utilized in the performance of the first job function further comprises the following program instructions, stored on the one or more computer readable storage devices, which when executed by one or more processors, cause the one or more processors to:

examine the usage log data for data pertaining to the services utilized in the performance of the first job function by the first user; and responsive to determining that data pertaining to each of the services utilized by the first user is not available, querying the first user for the usage information for each of the services utilized by the first user.

9. A computer system for transitioning services from a first user to a second user, the computer system comprising:

one or more computer processors;

one or more computer readable storage devices, wherein the one or more computer readable storage devices are not signals per se; and program instructions stored on the one or more computer readable storage devices, for execution by at least one of the one or more computer processors, the program instructions comprising;

program instructions to determine services utilized by the first user in performance of a first job function, wherein the second user in a second job function is transitioning to the first job function;

program instructions to receive usage log data for each of the services utilized in the performance of the first job function;

program instructions to generate natural language usage information for each of the services utilized in the performance of the first job function based on the received usage log data;

program instructions to, responsive to determining a first service of the services utilized by the first user in the performance of the first job function is not included in services utilized by the second user in the performance of the second job function, update an access control list tracking service usage for the first job function and the second job function, wherein updating the access control list grants the second user access to the first service;

program instructions to determine that the second user does not have a user account for authenticating access to the first service based on the user account not being present in the access control list program instructions to, responsive to an existing user account for the first user for authenticating access to the first service includes information specific to the first user, create a user account for the second user for authenticating access to the first service based on the existing user account for the first user for authenticating access to the first service, wherein the created user account excludes the determined information specific to the first user; and program instructions to display on a computer to the second user the services utilized by the first user in performance of the first job function, information associated with the created user account for the second user, and the generated natural language usage information for each of the services.

10. The computer system of claim 9, wherein the usage information for each of the services includes common actions performed by the first user in use of the service and common actions performed by the service responsive to the first user.

11. The computer system of claim 9, wherein determining the services further comprises program instructions, stored on the one or more computer readable storage devices, which when executed by one or more processors, cause the one or more processors to:

determine one or more additional users with the job function;

compare each of the one or more additional users historical use of services with the historical user of services by the first user; and determine common services utilized by the one or more additional users with the job function.

12. The method of claim 1, wherein the usage information for each of the services includes information on how to access the service.

13. The method of claim 1, wherein the usage information for each of the services includes a server location for the service.

14. The computer program product of claim 5, wherein the usage information for each of the services includes information on how to access the service.

15. The computer program product of claim 5, wherein the usage information for each of the services includes a server location for the service.

16. The computer system of claim 9, wherein the usage information for each of the services includes information on how to access the service.

17. The computer system of claim 9, wherein the usage information for each of the services includes a server location for the service.

* * * * *